(12) United States Patent
Wright et al.

(10) Patent No.: US 8,124,243 B2
(45) Date of Patent: Feb. 28, 2012

(54) FILMS FOR USE IN HIGH STRENGTH BAGS

(75) Inventors: Sydney R. Wright, Brussels (BE); Donna S. Davis, Beaumont, TX (US); Jay K. Keung, Humble, TX (US); Pang-Chia Lu, Pittsford, NY (US)

(73) Assignee: Exxonmobil Oil Corporation, Irving, TX (US)

( * ) Notice: Subject to any disclaimer, the term of this patent is extended or adjusted under 35 U.S.C. 154(b) by 1082 days.

(21) Appl. No.: 11/726,806

(22) Filed: Mar. 23, 2007

(65) Prior Publication Data

US 2008/0233375 A1 Sep. 25, 2008

(51) Int. Cl.
*B32B 5/16* (2006.01)
*B32B 18/00* (2006.01)
*B32B 27/08* (2006.01)

(52) U.S. Cl. ........ 428/515; 428/323; 428/328; 428/329; 428/330; 428/331

(58) Field of Classification Search ............ None
See application file for complete search history.

(56) References Cited

U.S. PATENT DOCUMENTS

| | | | |
|---|---|---|---|
| 4,151,318 A | 4/1979 | Marshall | 428/35 |
| 4,511,609 A | 4/1985 | Craver et al. | 428/35 |
| 5,241,030 A * | 8/1993 | Barry et al. | 526/348.1 |
| 5,283,128 A | 2/1994 | Wilhoit | 428/516 |
| 5,314,749 A | 5/1994 | Shah | |
| 5,403,668 A | 4/1995 | Wilhoit | 428/500 |
| 5,885,721 A | 3/1999 | Su et al. | 428/516 |
| 6,228,505 B1 | 5/2001 | Agent et al. | 428/516 |
| 6,391,411 B1 | 5/2002 | Duckwall, Jr. et al. | 428/35.7 |
| 6,534,166 B1 * | 3/2003 | Pip et al. | 428/316.6 |
| 6,540,949 B2 | 4/2003 | Pip et al. | 264/172.19 |
| 6,689,857 B1 * | 2/2004 | Larter et al. | 526/348.5 |
| 6,696,166 B2 | 2/2004 | Bayley et al. | 428/523 |
| 2004/0077810 A1 | 4/2004 | Marechal | 526/183 |
| 2006/0110616 A1 | 5/2006 | Davis | 428/516 |

FOREIGN PATENT DOCUMENTS

| | | |
|---|---|---|
| EP | 0 409 615 | 1/1991 |
| EP | 0 681 914 | 11/1995 |
| WO | WO 94/21726 | 9/1994 |
| WO | WO 97/24272 | 7/1997 |
| WO | WO 01/85448 | 11/2001 |

OTHER PUBLICATIONS

Arina, et al., "*Mineral Fillers in Low Density-Polyethylene Films*", Polymer Engineering and Science, Jan. 1979, vol. 19, No. 1, pp. 30-39.

Lim et al., "*Effect of Starch Granule Size on Physical Properties of Starch-Filled Polyethylene Film*", Biotechnol. Prog., 1992, vol. 8, No. 1, pp. 51-57.

* cited by examiner

*Primary Examiner* — Sheeba Ahmed
(74) *Attorney, Agent, or Firm* — Kevin M. Faulkner; Denise J. King

(57) ABSTRACT

Thermoplastic films particularly suited for use in bags including at least a core layer comprising an ethylene copolymer, wherein the films are subjected to post-quench biaxial orientation are provided. Optionally, the films may have a first skin layer and/or a second skin layer located on each side of the core layer. Embodiments may have the desirable combination of improved puncture toughness and ultimate tensile strength, low manufacturing cost and desirable optical and tactile properties.

29 Claims, No Drawings

FILMS FOR USE IN HIGH STRENGTH BAGS

FIELD OF THE INVENTION

This invention relates generally to thermoplastic films with improved puncture toughness and ultimate tensile strength, low manufacturing cost and desirable optical and tactile properties. More specifically, this invention relates to thermoplastic films for use in bags, including garbage bags, and other similar applications.

BACKGROUND OF THE INVENTION

It is desirable for plastic bags, particularly those used to contain bulk waste materials, to be resistant to damage by puncture and yielding under stress. Films with high strength characteristics, including ultimate tensile strength and puncture toughness, are needed in such applications. Additionally, thin films that exhibit high strength requirements provide a better cost-performance relationship for the consumer. Currently, such bags are most commonly produced from polyolefin films, including polyethylene films.

For many years, high performance polyolefins, such as low density polyethylene (LDPE), have been readily available at a low manufacturing cost sufficient to justify commercial use in trash bags, including heavy duty garbage bags, leaf bags and trash can liners. The use of polyethylene, more particularly low density polyethylene, allows for the production of bags with remarkably thin gauge and flexibility while maintaining high strength characteristics such as puncture toughness and ultimate tensile strength.

More recently, linear low density polyethylene (LLDPE) has been used in place of conventional highly branched LDPE in many film applications, including bags. LLDPE is widely recognized as being tougher and stronger than LDPE, thus contributing to reduced bag failures, including punctures and splitting under stress. In particular, LLDPEs made with metallocene or single site catalysts, and LLDPEs containing hexene and/or octene comonomers, including "super hexenes," have been used to provide improved toughness.

Prior art polyethylene film bags are generally manufactured by blown film processes and are frequently characterized by limited toughness and strength properties U.S. Patent Publication No. 2004/0077810 to Marechal discloses a linear low density polyethylene resin produced with a metallocene or late transition metal catalyst having a density of from 0.906 to 0.940 g/cm$^3$, a Melt Index of from 0.01 to 150 g/min., and a molecular weight distribution of less than 4. The publication further discloses blown films. Marechal does not disclose a cavitated, post-quench biaxially oriented film.

U.S. Pat. No. 6,696,166 to Bayley et al. (Nova Chemicals International S.A.) discloses a plastic film suitable for the preparation of packaging and trash bags having a desirable balance of physical properties. The film is prepared using a pseudohomogeneous linear low density polyethylene resin on a blown film extrusion line using specific extrusion conditions and a specific annular die. A Ziegler-Natta catalyst is employed in the production of the resin. Bayley et al. do not disclose a cavitated, post-quench biaxially oriented film.

U.S. Pat. No. 6,689,857 to Larter et al. (ExxonMobil Oil Corporation) discloses a high density polyethylene film having high-biaxial orientation and optional cavitation for special film applications. Specifically, the film has an orientation imbalance with orientation in the machine direction ranging from 5:1 to 8:1 and transverse orientation ranging from 6:1 to 15:1. The film comprises 50% to 90% high density polyethylene. Larter et al. do not disclose use of a linear low density polyethylene.

U.S. Pat. No. 6,391,411 to Duckwall, Jr. et al. (Printpack Illinois, Inc.) discloses an oriented, high molecular weight, high density polyethylene film with superior toughness properties, a method for making the film, and articles made therefrom, particularly bags. Duckwall, Jr. et al. do not teach a cavitated and biaxially oriented linear low density polyethylene.

U.S. Pat. No. 4,511,609 to Craver et al. (Union Carbide Corporation) discloses a multilayer polyethylene film suitable for use in the manufacture of garbage and trash bags wherein the film comprises a first outer layer of low pressure, low density polyethylene, a core layer of high pressure, low density polyethylene and a second outer layer of high pressure, low density polyethylene. Craver et al. do not disclose a cavitated film or biaxial orientation.

U.S. Pat. No. 6,228,505 to Agent et al. (Mobil Oil Corporation) discloses a biaxially oriented polyethylene film having unidirectional tear characteristics in the machine direction and the method of making same. The film comprises a core layer of a medium density polyethylene, an optional cavitating agent in the core layer, and at least one skin layer also made from polyethylene. Contrary to the teachings of Agent et al., the present invention is directed to a film that withstands tears.

None of the prior art films described above combine desired puncture toughness and ultimate tensile strengths with low manufacturing costs and excellent optical and tactile properties. Opportunities exist for cavitated, biaxially oriented polyethylene films to replace current blown films for use in bag applications, including garbage bags, requiring high puncture toughness and ultimate tensile strength properties. Clear polyethylene films and polyethylene films containing colorants and/or pigments according to this invention are also contemplated where those films are biaxially oriented and possess the desired puncture toughness and ultimate tensile strength. The present invention meets these and other needs.

SUMMARY OF THE INVENTION

The present invention generally relates to a thermoplastic film comprising at least a core layer, the core layer comprising an ethylene copolymer having a density equal to or less than 0.940 g/cm$^3$, the thermoplastic film having been subjected to a post-quench biaxial orientation process whereby the thermoplastic film has a machine direction orientation ratio of at least 2, a transverse direction orientation ratio of at least 4, a machine direction ultimate tensile strength of at least 45 MPa, and a transverse direction ultimate tensile strength of at least 65 MPa.

In another embodiment, the invention generally relates to a multi-layer thermoplastic film comprising a core layer, the core layer comprising an ethylene copolymer having a density equal or less than 0.940 g/cm$^3$; a first skin layer on a side of the core layer; and a second skin layer on a side of the core layer opposite the first skin layer, the thermoplastic film having been subject to a post-quench biaxial orientation process whereby the thermoplastic film has a machine direction orientation ratio of at least 2, a transverse orientation ratio of at least 4, a machine direction ultimate tensile strength of at least 45 MPa, and a transverse direction ultimate tensile strength of at least 65 MPa.

In yet another embodiment, the invention generally relates to a method of preparing a thermoplastic film comprising the steps of forming a thermoplastic film, wherein the film comprises at least a core layer, the core layer comprising an ethylene copolymer having a density equal to or less than 0.940 g/cm$^3$; quenching the thermoplastic film; and biaxially orienting the thermoplastic film using a process selected from the group consisting of a tenter frame process, a double-bubble process and a LISIM® orientation process, the thermoplastic film having a machine direction orientation ratio of at least 2, a transverse direction orientation ratio of at least 4, a machine direction ultimate tensile strength of at least 45 MPa and a transverse direction ultimate tensile strength of at least 65 MPa.

In still another embodiment, the invention generally relates to a method of preparing a thermoplastic film comprising the steps of forming a thermoplastic film wherein the film comprises a core layer, the core layer comprising an ethylene copolymer having a density equal to or less than 0.940 g/cm$^3$, a first skin layer on a side of the core layer, and a second skin layer on a side of the core layer opposite the first skin layer; quenching the thermoplastic film; and biaxially orienting the thermoplastic film using a process selected from the group consisting of a tenter frame process, a double-bubble process and a LISIM® orientation process, the thermoplastic film having a machine direction orientation ratio of at least 2, a transverse direction orientation ratio of at least 4, a machine direction ultimate tensile strength of at least 45 MPa and a transverse direction ultimate tensile strength of at least 65 MPa.

Some embodiments of the invention generally relate to a package comprising a thermoplastic film comprising at least a core layer, the core layer comprising an ethylene copolymer having a density equal to or less than 0.940 g/cm$^3$, the thermoplastic film having been subjected to a post-quench biaxial orientation process whereby the thermoplastic film has a machine direction orientation ratio of at least 2, a transverse direction orientation ratio of at least 4, a machine direction ultimate tensile strength of at least 45 MPa, and a transverse direction ultimate tensile strength of at least 65 MPa, the thermoplastic film being formed into a package adapted to contain a product.

Additionally, some embodiments of the invention generally relate to a label comprising a thermoplastic film comprising a least a core layer, the core layer comprising an ethylene copolymer having a density equal to or less than 0.940 g/cm$^3$, the thermoplastic film having been subjected to a post-quench biaxial orientation process whereby the thermoplastic film has a machine direction orientation ratio of at least 2, a transverse direction orientation ratio of at least 4, a machine direction ultimate tensile strength of at least 45 MPa, and a transverse direction orientation ratio of at least 65 MPa.

The invention also encompasses finished bags, pouches, sealed bags and other articles embodying the film structures above.

DETAILED DESCRIPTION OF THE INVENTION

Various specific embodiments, versions and examples of the invention will now be described, including exemplary embodiments and definitions that are adopted herein for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will always refer to the appended claims, including their equivalents, and elements or limitations that are equivalent to those that are recited. Any reference to the "invention" may refer to one or more, but not necessarily all, of the inventions defined by the claims.

As used herein, "polymer" may be used to refer to homopolymers, copolymers, interpolymers, terpolymers, etc. Likewise, a "copolymer" may refer to a polymer comprising two monomers or to a polymer comprising three or more monomers.

As used herein, "intermediate" is defined as the position of one layer of a multi-layer film wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, "elastomer" is defined as a copolymer that can be extended or stretched with force to at least 200% of its original length (i.e., twice it original length), and upon removal of the force, rapidly (e.g., within 5 seconds) return to its approximate original dimensions.

As used herein, "plastomer" is a term used by those skilled in the art and includes propylene-based or ethylene-based copolymers having a density in the range of 0.850 g/cm$^3$ to 0.920 g/cm$^3$, typically produced using single site or metallocene catalysts.

As used herein, "post-quench" is defined to be the period of time during the film manufacturing process following extrusion and cooling of the film. Cooling may be performed by any method known in the art including, but not limited to, air-cooling, submersion in a water bath and use of a chill roll.

As used herein, "biaxial orientation ratio" is defined to be the product of the machine direction orientation ratio and the transverse direction orientation ratio of the film.

We have discovered certain film structures having improved properties. Films according to this invention provide improved puncture toughness and ultimate tensile strength, low manufacturing costs and excellent optical and tactile properties. To facilitate these improved properties, a linear low density polyethylene film is subjected to a post-quench biaxial orientation process. Preferably the orientation ratio of the film is at least 2 in the machine direction and at least 4 in the transverse direction. Additional film layers may also be provided.

In a preferred embodiment, this invention relates to a thermoplastic film comprising at least a core layer, the core layer comprising an ethylene copolymer having a density equal to or less than 0.940 g/cm$^3$, the thermoplastic film having been subjected to a post-quench biaxial orientation process whereby the thermoplastic film has a machine direction orientation ratio of at least 2, a transverse direction orientation ratio of at least 4, a machine direction ultimate tensile strength of at least 45 MPa, and a transverse direction ultimate tensile strength of at least 65 MPa.

Core Layer

The thermoplastic film of the current invention comprises at least a first layer, hereinafter referred to as the core layer. As is known to those skilled in the art, the core layer is commonly the thickest layer of a film. In multi-layer films, the core layer frequently provides the foundation for the total film structure. The core layer of the films of the present invention comprises an ethylene copolymer. Preferred ethylene copolymers comprise a blend of ethylene and at least one $C_3$ to $C_{20}$ alpha-olefin comonomer. More preferably, the alpha-olefin comonomer comprises butene, hexene, octene or pentene. In some embodiments of this invention, the ethylene copolymer may be selected from the group consisting of LLDPE, very low density polyethylene (VLDPE), elastomers and plastomers. The ethylene copolymer may be prepared using any catalyst known in the art, including single site or metallocene catalysts. The use of a single site catalyst, including metallocene catalysts, may contribute to the improved ultimate tensile strength and puncture toughness properties of the ethylene copolymer films of this invention. In a preferred embodiment, the ethylene copolymer is a metallocene catalyzed, linear low density polyethylene (mLLDPE) having a density equal to or less than $0.940 \text{ g/cm}^3$. More preferably, the density of the ethylene copolymer is equal to or less than $0.927 \text{ g/cm}^3$. Further, in preferred embodiments of this invention, the ethylene copolymer has a Melt Index ranging from about 0.1 g/10 min. to about 20.0 g/10 min.

Examples of suitable LLDPEs and VLDPEs are Dowlex 2045 (commercially available from Down Chemical Company of Midland, Mich.), ATTANE® 4201 and 4202, LL1001, LL1002, LL2001, LL3002 and LL3003.32 (commercially available from ExxonMobil Chemical Company of Baytown, Tex.). Examples of suitable mLLDPEs and mVLDPEs are EXCEED™ 1012, 1018 and 2018 metallocene polyethylenes (commercially available from ExxonMobil Chemical Company of Baytown, Tex.). And, examples of suitable plastomers and elastomers are EXACT™ 5361, 4049, 5371, 8201, 4150, 5181, 3132 ethylene plastomers (commercially available from ExxonMobil Chemical Company of Baytown, Tex.), ENGAGE™ thermoplastic polyolefin elastomers and AFFINITY™ polyolefin plastomers (both commercially available from The Dow Chemical Company of Midland, Mich.).

The core layer may further include a plasticizer. As is known to those skilled in the art, plasticizers are typically used to soften polymer chains, thereby increasing the workability and flexibility of the polymer. Additionally, plasticizers are known to combine with the amorphous regions of LLDPE and extend the degree of polymer chain entanglement, thus increasing the elasticity of the polymer sheet at elevated temperatures. In the current invention, the increased elasticity may contribute to improved processing upon orientation. Plasticizers for use with the current invention include amorphous or semi-crystalline polymers with a melting point less than about 125° C. or processing additives such as white oil. Examples of suitable plasticizers are LDPE, VLDPE, ethylene vinyl acetate (EVA) copolymers, ethylene acrylic acid (EAA) copolymers, ethylene-ethyl acrylate (EEA) copolymers, propylene plastomers and elastomers, ethylene plastomers and elastomers, polyolefin adhesive materials, hydrocarbon and natural resins, waxes (including synthetic, micro-crystalline and paraffinic waxes), poly-alpha-olefins, low melt temperature ethylene polymers or copolymers, ethylene propylene copolymers or terpolymers, or combinations thereof. Commercially available plasticizers that may be suitable for use as described herein include, but are not limited to, VISTAMAXX™ 3000, EXACT™ 5181, ESCORENE™ ULTRA LD-720.92, OPPERA™ PA-851N, PA-702N and ELEVAST® (all commercially available from ExxonMobil Chemical Company of Baytown, Tex.) and BE SQUARE™ microcrystalline wax (commercially available from Baker Petrolite of Sugarland, Tex.).

In some embodiments of the present invention, plasticizers may be present in the core layer in an amount ranging from about 0 wt % to about 60 wt %, preferably ranging from about 5 wt % to about 20 wt %.

Cavitating agents may also be present in the core layer, according to this invention. Generally, cavitating agents may be present in an amount ranging from about 2 wt % to about 60 wt %, preferably from about 5 wt % to about 15 wt %. Cavitating agents may include any suitable organic or inorganic particulate material that is incompatible with the polymer material(s) of the core layer so that, upon stretching of the film during orientation, voids form around some or all of the cavitating agent particles, thereby creating an opaque material. Cavitation further imparts a pearlescent appearance and "soft touch" tactile characteristics to the film, which are desirable for consumers. The cavitating agent(s) may, for example, be any of those described in U.S. Pat. Nos. 4,377,616, 4,632, 869 and 5,691,043, the entire disclosures of which are incorporated herein by reference. Specific examples of suitable cavitating agents for use in the present invention are polyamides, polyesters, acetals, nylons, acrylic resins, cyclo-olefin polymers and copolymers, polybutylene terephthalate, nylon, solid glass spheres, hollow glass spheres, metals beads or spheres, ceramic spheres, calcium carbonate, silicone dioxide, aluminum silicate, magnesium silicate, talc, chalk and combinations thereof. The average diameter of the cavitating particles typically may be from about 0.1 µm to 10 µm.

The core layer may further comprise one or more additives such as opacifying agents, pigments, colorants, slip agents, antioxidants, anti-fog agents, anti-static agents, fillers, moisture barrier additives, gas barrier additives and combinations thereof, as discussed in further detail below. Preferably, the total amount of additives, including cavitating agents, in the core layer ranges from about 0.2 wt % to about 40.0 wt %, more preferably from about 3.0 wt % to about 20.0 wt %.

In preferred embodiments, the core layer has a thickness in the range of from about 5.0 µm to about 100.0 µm, more preferably from about 10.0 µm to about 50.0 µm.

First Skin Layer

A first skin layer may be present in some multi-layer embodiments of this invention. When present, the first skin layer may be contiguous to a side of the core layer. In other multi-layer embodiments, one or more other layers may be intermediate the first skin layer and the core layer. The first skin layer may include a polymer that is suitable for heat-sealing or bonding to itself when crimped between heated crimp-sealer jaws. The skin layer may also increase the impact strength of the overall structure. In some preferred embodiments, the skin layer comprises at least one polymer selected from the group consisting of propylene homopolymers, ethylene-propylene random copolymers, propylene-ethylene random copolymers, propylene-butylene random copolymers, ethylene-propylene-butylene terpolymers, polypropylene plastomers, polyethylene plastomers, LDPE, LLDPE, medium density polyethylene (MDPE), high density polyethylene (HDPE), VLDPE, mLLDPE, ethylene copolymers and terpolymers (including acrylates, esters, and other functional groups), ionomers, polyester, nylon and combinations thereof.

The first skin layer may further comprise one or more additives such as cavitating agents, opacifying agents, pigments, colorants, slip agents, antioxidants, anti-fog agents, anti-static agents, fillers, moisture barrier additives, gas barrier additives and combinations thereof, as discussed in further detail below. Preferably, the total amount of additives, including cavitating agents, in the first skin layer ranges from about 0.2 wt % to about 60.0 wt %, more preferably from about 3.0 wt % to about 20.0 wt %.

In preferred embodiments, the first skin layer has a thickness in the range of from about 0.5 µm to about 20.0 µm, more preferably from about 2.0 µm to about 10.0 µm.

Second Skin Layer

A second skin layer is optional and when present, is provided on a side of the core layer opposite the first skin layer. The second skin layer may be contiguous to the core layer or, alternatively, one or more other layers may be positioned intermediate the core layer and the second skin layer. The second skin layer comprises a film-forming thermoplastic polymer. The thermoplastic polymer of the second skin layer may be the same as or different from the polymer(s) of the first skin layer. The thermoplastic polymer of the second skin layer may be the same as or different from the polymer(s) of the core layer. The film-forming, thermoplastic polymer of the second skin layer is not particularly limited and may include any such polymer known in the art, or any such blend of polymers. Preferably, the thermoplastic polymer of the second skin layer comprises a Ziegler-Natta or metallocene catalyzed film-forming polyolefin. Most preferably, the thermoplastic polymer of the second skin layer comprises a film-forming ethylene polymer or propylene polymer. For example, the thermoplastic polymer of the second skin layer may comprise isotactic propylene homopolymer, propylene copolymer, LLDPE, VLDPE, mLLDPE, mVLDPE, plastomers, or HDPE.

The second skin layer may further comprise one or more additives such as cavitating agents, opacifying agents, pigments, colorants, slip agents, antioxidants, anti-fog agents, anti-static agents, fillers, moisture barrier additives, gas barrier additives and combinations thereof, as discussed in further detail below. Preferably, the total amount of additives, including cavitating agents, in the second skin layer ranges from about 0.2 wt % to about 60.0 wt %, more preferably from about 3.0 wt % to about 20.0 wt %.

In preferred embodiments, the second skin layer has a thickness in the range of from about 0.5 µm to about 20.0 µm, more preferably from about 2.0 µm to about 10.0 µm.

Other Film Layers

If desired, other film layers, such as tie layers, may be included in the films of the present invention.

Coating

The films of the present invention may optionally comprise a coating. Coatings are often applied to the surface of polymeric films to enhance the barrier properties, including odor barriers, of the films. Examples of suitable coatings for use with the current invention include polyvinylidene chloride, ethylene vinyl alcohol (EVOH), polyvinyl alcohol (PVOH) and EAA and acrylic-containing coatings. These coatings may provide films with enhanced barrier properties and additionally may contribute to improved seal strength, excellent hot tack characteristics and improved coefficients of friction which contribute to good machinability characteristics. Coatings incorporating polymers such as EVOH copolymers and PVOH copolymers may contribute to thermal stability and gas barrier properties of the films.

The coating may be applied to the film surface by any of a variety of techniques including gravure coating, roll coating and spraying. The coating may be applied to the film surface after the surface is treated by any of a variety of methods to energize the film surface such as plasma discharge, flame treatment, corona treatment, UV radiation, electron radiation, and combinations thereof. Alternatively, the coating may be applied to a non-treated film surface having a surface energy sufficient to promote adhesion.

Lamination

For some applications, it may be desirable to laminate the films of this invention to other polymeric films, paper or other such substrates commonly known in the art. Lamination may be performed to impart additional properties to the film such as increasing barrier properties or tear strength in applications where such properties are preferred. The laminated structure can be formed by extrusion lamination, also known as polymount lamination, or by adhesive lamination of two or more film webs using solvent-based, water-based or curable adhesives.

Metallization

For some applications, it may be desirable to metallize the films of this invention to improve aesthetics or barrier properties of the film. Before metallization, an outer surface of the film may be treated to increase its surface energy. This treatment may be accomplished by employing known techniques such as flame treatment, plasma treatment, polarized flame, corona discharge, film chlorination, e.g., exposure of the film surface to gaseous chlorine, treatment with oxidizing agents such as chromic acid, hot air or steam treatment, flame treatment and the like. After treatment of the film surface, the metal is then applied thereto.

The outer surface of the film is metallized using conventional methods, such as vacuum metallization by deposition of a metal layer such as aluminum, copper, silver, chromium or mixtures thereof.

Orientation

In preferred embodiments, the films of the current invention are subjected to a post-quench biaxial orientation process. As is well known in the art, orientation may be achieved by reheating an extruded, quenched and unoriented polymeric film in an oven or heated zone that raises the temperature of the polymeric material above its glass transition temperature. The material is then stretched in at least one direction to orient, or align, the polymer chains within the film. The film is then annealed and subsequently cooled thereby allowing crystals to reform so that the stretch and orientation is maintained.

Orientation in the direction of extrusion is known as machine direction (MD) orientation. Orientation perpendicular to the direction of extrusion is known as transverse direction (TD) orientation. Either sequential or simultaneous orientation processes may be utilized depending upon the desired film features. Sequential orientation may be accomplished by stretching or pulling a film first in the MD followed by TD orientation. A simultaneous orientation process means the film is stretched in both the machine direction and the transverse direction in a single step utilizing a series of motors rather than clips, for example as with the LISIM® process. Tenter orientation processes may also be used in the biaxial orientation of the films of the current invention. In some embodiments of present invention, a double-bubble orientation process may be used.

Preferred machine direction orientation ratios for the films of the current invention range from preferably at least 2, more preferably at least 3 and most preferably at least 4. Preferred transverse direction orientation ratios for the films of the current invention range from preferably at least 4, more preferably at least 6 and most preferably at least 9.

A biaxial orientation ratio is the product of the machine direction orientation ratio and the transverse direction orientation ratio of the film. In preferred embodiments of the current invention, the film has a biaxial orientation ratio ranging from about 8 to about 60, subsequent to a post-quench biaxial orientation process.

High tensile strengths are preferable for films used in the applications of the current invention, including bags, as these measures are indicative of performance and reliability desired by consumers. The films described herein may exhibit a machine direction ultimate tensile strength of preferably at least 45 MPa, more preferably at least 55 MPa, and most preferably at least 60 MPa. Additionally, films according to this invention may exhibit a transverse direction ultimate tensile strength of preferably at least 65 MPa, more preferably at least 80 MPa and most preferably at least 100 MPa.

The biaxially oriented films of the present invention have high puncture strength characteristics contributing to the integrity of the products produced therefrom, including bags, under conditions of force or stress applied with use by consumers. In preferred embodiments, the films have a puncture strength of at least 10.0 kg/cm, more preferably at least 20.0 kg/cm and still more preferably at least 30.0 kg/cm.

Films of higher gauge (thickness) provide an aesthetic and tactile quality that is desirable to consumers. However, higher gauge usually implies more material, and hence, higher cost for the film. The cavitated films of the current invention allow for the use of reduced quantities of polymers and other materials, thereby resulting in materials cost savings to the manufacturer, while still maintaining the aesthetic and tactile properties of the film as well as the puncture toughness and ultimate tensile strength properties, as discussed herein.

Optical gauge is a measure of the thickness of cavitated films. As is commonly known in the art, optical gauge of cavitated (or foamed) films is determined by using a non-contact procedure utilizing laser technology, as the use of a traditional mechanical micrometer may collapse cavitated films. A post-quench, biaxially oriented, cavitated film according to this invention may have an optical gauge ranging from about 15 microns to about 50 microns, preferably from about 20 microns to about 35 microns.

Additives

Additives that may be present in one or more layers of the multi-layer films of this invention, include, but are not limited to opacifying agents, pigments, colorants, slip agents, anti-oxidants, anti-fog agents, anti-static agents, anti-block agents, fillers, moisture barrier additives, gas barrier additives and combinations thereof. Such additives may be used in effective amounts, which vary depending upon the property required.

Opacifying agents, pigments and colorants are typically added to polymers to impart opacity and, in some cases, particular color to the resulting films. Examples of opacifying agents, pigments or colorants for use with the current invention are iron oxide, carbon black, colored pigments, aluminum, titanium dioxide ($TiO_2$), calcium carbonate ($CaCO_3$), polybutylene terephthalate, talc, and combinations thereof. Colored pigments and colorants include agents that may be added to the polymer to impart any desired shade of color such as pink, blue, green, yellow, etc. Opacifying agents, pigments and colorants may also contribute to the desirable optical qualities of the films of the current invention by imparting color and a pearlescent appearance that appeal to consumers.

Slip agents may include higher aliphatic acid amides, higher aliphatic acid esters, waxes, silicone oils, and metal soaps. Such slip agents may be used in amounts ranging from 0.1 wt % to 2 wt % based on the total weight of the layer to which it is added. An example of a slip additive that may be useful for this invention is erucamide.

Non-migratory slip agents, used in one or more skin layers of the multi-layer films of this invention, may include polymethyl methacrylate (PMMA). The non-migratory slip agent may have a mean particle size in the range of from about 0.5 µm to 8 µm, or 1 µm to 5 µm, or 2 µm to 4 µm, depending upon layer thickness and desired slip properties. Alternatively, the size of the particles in the non-migratory slip agent, such as PMMA, may be greater than 20% of the thickness of the skin layer containing the slip agent, or greater than 40% of the thickness of the skin layer, or greater than 50% of the thickness of the skin layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes is also contemplated.

Suitable anti-oxidants may include phenolic anti-oxidants, such as IRGANOX® 1076 (commercially available from Ciba-Geigy Company of Switzerland) and phosphite anti-oxidants such as IRGANOX® 168 (also commercially available from Ciba Geigy Company of Switzerland.) Such anti-oxidants are generally used in amounts ranging from 0.1 wt % to 2 wt %.

Anti-static agents may include alkali metal sulfonates, polyether-modified polydiorganosiloxanes, polyalkylphenylsiloxanes, and tertiary amines. Such anti-static agents may be used in amounts ranging from about 0.05 wt % to 3 wt %, based upon the total weight of the layer(s).

Fillers and anti-blocking agents useful in this invention may include finely divided inorganic solid materials such as silica, fumed silica, diatomaceous earth, calcium carbonate, calcium silicate, aluminum silicate, kaolin, talc, bentonite, clay and pulp. Examples of suitable fillers and anti-blocking agents may include SYLOBLOC® 44 (commercially available from Grace Davison Products of Colombia, Md.), PMMA particles such as EPOSTAR™ (commercially available from Nippon Shokubai Co., Ltd. of Japan), or polysiloxanes such as TOSPEARL™ (commercially available from GE Bayer Silicones of Wilton, Conn.). Such fillers and anti-blocking agents comprise an effective amount up to about 3000 ppm of the weight of the layer(s) to which they are added.

Suitable moisture and gas barrier additives may include effective amounts of low-molecular weight resins, hydrocarbon resins, particularly petroleum resins, styrene resins, cyclopentadiene resins, and rosin and terpene derived resins.

Optionally, one or more skin layers may be compounded with a wax or coated with a wax-containing coating, for lubricity, in amounts ranging from 1 wt % to 15 wt % based on the total weight of the skin layer. Wax-containing coatings may also be applied to an outer surface of a monolayer film. Any conventional wax, such as, but not limited to Carnauba™ wax (commercially available from Michelman Corporation of Cincinnati, Ohio), that is useful in thermoplastic films is contemplated.

Industrial Applicability

Films according to the present invention are useful as stand-alone film webs, or they may be coated, laminated to other film structures and/or metallized. Films according to the present invention may be prepared by any suitable methods comprising the steps of extruding a film according to the description and claims of this specification, quenching the film, and then biaxially orienting and preparing the film for intended use such as by coating, slitting, or other conventional converting methods.

For some applications, it may be desirable to coat and/or metallize the films of this invention or laminate the films to other polymeric films for specific purposes or to impart specific preferred properties. Such activities are typically performed by the ultimate end-user or film converters who process films for supply to the ultimate end-user.

In one embodiment, a method of preparing a film according to the present invention comprises at least the steps of forming a thermoplastic film wherein the film comprises an ethylene copolymer having a density equal to or less than 0.940 g/cm$^3$, quenching the thermoplastic film, and biaxially orienting the thermoplastic film using a process selected from the group consisting of a tenter frame process, a double-bubble process and a LISIM® orientation process, wherein the thermoplastic film has a machine direction orientation ratio of at least 2, a transverse direction orientation ratio of at least 4, a machine direction ultimate tensile strength of at least 45 MPa and a transverse direction ultimate tensile strength of at least 65 MPa.

The method may further comprise forming a first skin layer on a side of the core layer; and a second skin layer on a side of the core layer opposite the first skin layer.

The prepared film may be used in trash bags including heavy duty garbage bags, leaf bags, trash can liners and other similar applications.

Experimental

The films of the present invention will be further described with reference to the following non-limiting examples.

Testing Methods

Density is measured according to density-gradient method ASTM-D-1505 for plastic materials and is expressed in units of grams per cubic centimeter (g/cm$^3$).

Ultimate tensile strength is measured according to ASTM D-882 test method and is expressed in units of megapascals (MPa).

Puncture strength is measured according to a probe puncture energy test using a Sintech tensile testing unit with a 50 pound load cell and a 2 mm diameter probe with a radiused end and flat stock steel grip face protectors. The testing unit records a reading of the force required to penetrate the sample film structure using the designated probe. The sample film is cut in the transverse direction with a minimum size of approximately 5 centimeters (cm) wide by 15 cm long. Three gauge readings are taken per sample across the sample area.

A piece of two-sided tape approximately 2.5 cm wide is applied to the sample holder to cover the opening of the holder. A hole is made in the tape in line with the hole in the holder to ensure the reported measurement of the force required to puncture the film. The sample is then applied to the tape with the test area located over the hole in the sample holder. The sample and holder are placed on the bottom jaw socket of the testing unit positioned so that the probe will strike the sample as near to its center as possible. The probe is adjusted to a position approximately 0.6 cm above the sample holder. The probe, traveling at a constant speed of approximately 25 cm/min, is lowered onto the film and continues downward until the sample is punctured. The energy consumed during the penetration of the film is measured and reported as "puncture force" or "puncture strength", as used herein, and is expressed in units of kilograms/centimeter.

Melt Index is measured according to ASTM D-1238 and is expressed in units of grams per 10 minutes (g/10 min.).

Optical gauge is measured using a beta LaserMike Model 283-20 BenchMike from Beta LaserMike USA and is expressed in units of microns (μ). The LaserMike emits a low power helium-neon laser beam curtain at a wavelength of 632.8 nanometers (nm). The film sample to be measured is positioned within the equipment such that it intercepts the path of the laser curtain. The film sample produces a shadow upon contact with the laser curtain which, in turn, generates an electrical signal proportional to the size of the sample. The electrical signal is decoded by the equipment to obtain the thickness, or other preferred measure, of the sample. The resolution is of the order of 0.2 microns.

EXAMPLES

The film samples provided below were produced on a pilot line. The structure of each sample consisted of three layers, as indicated below. In each sample herein, the first skin layer and the second skin layer were substantially the same.

First Skin Layer
Core Layer
Second Skin Layer

As provided in these examples, the polymers used to produce the sample films, including polymers incorporated into masterbatch compositions and those used as plasticizers, are listed below in Table 1.

TABLE 1

| Polymer | Product Code | Manufacturer | Comonomer | Catalyst | Melt Index | Density |
|---|---|---|---|---|---|---|
| mVLDPE | Exceed 1012 | ExxonMobil Chemical Company | Hexene | Metallocene | 1.0 | 0.912 |
| mLLDPE | Exceed 1018 | ExxonMobil Chemical Company | Hexene | Metallocene | 1.0 | 0.918 |
| mLLDPE | Exceed 2018 | ExxonMobil Chemical Company | Hexene | Metallocene | 2.0 | 0.918 |
| Plastomer | Exact 5181 | ExxonMobil Chemical Company | Octene | Metallocene | 1.1 | 0.882 |
| Propylene Elastomer | VM3000 | ExxonMobil Chemical Company | Propylene | Metallocene | 8.0 | 0.871 |
| EVA | Escorene Ultra 720.92 | ExxonMobil Chemical Company | 18.5% VA | N/A | 1.6 | 0.941 |
| LLDPE | ExxonMobil 3003.32 | ExxonMobil Chemical Company | Hexene | Z-N | 3.2 | 0.9175 |
| LLDPE | Dow LLDPE GRSN 9820 NT 7 | Dow Chemical Company | Butene | Z-N | 20.0 | 0.924 |

The masterbatch compositions used herein were prepared by combining a base polymer(s) with highly concentrated amounts of additives, including cavitating agents and/or opacifying agents. Use of a masterbatch promotes even distribution of the additives into the film resin. The masterbatch compositions of the sample films herein are listed in Table 2.

TABLE 2

| Masterbatch | Composition |
|---|---|
| MBa | 50% Exceed CA 2018 + 50% (2μ) CaCO$_3$ |
| MBb | 50% Exceed CA 2018 + 50% (3μ) CaCO$_3$ |
| MBc | 25% ExxonMobil 3003.32 + 25% Dow LLDPE GRSN 9820 NT 7 + 50% (2μ) CaCO$_3$ |

The sample films were then prepared by separately dry blending the components of each layer. For each sample film, the core layer was created by dry mixing 20% masterbatch with the remaining core layer polymer(s) as provided in Table 3, below. The dry blend for the core layer was then melted and fed through a core layer extruder. The components of the skin layers were separately dry blended, melted and fed through a first skin layer extruder and a second skin layer extruder. The melt blends of all three layers were simultaneously advanced from the extruders through a single slot die to create the film resin. The resin was then quenched using a chill roll followed by submersion in a water bath. Next, the films were reheated in a machine direction orienter to a temperature below the melting temperature of the resin. The films were then stretched (oriented) in the MD to a machine direction orientation ratio as indicated in Table 3 below and annealed in the annealing sections of the machine direction orienter. The MD stretched film was then reheated in the TD oven and oriented in the transverse direction to a transverse direction orientation ratio as indicated in Table 3 below.

The film samples were tested for ultimate tensile strength in the machine direction and transverse direction using test method ASTM D-882. Puncture force was also tested as described herein. The results are provided in Table 3, below.

TABLE 3

| Sample No. | First skin and second skin layers | Skin Additive | Core Layer | Polymer Gauge μ | Optical Gauge μ | MDX | TDX | Ultimate Tensile Strength MD MPa | Ultimate Tensile Strength TD MPa | Puncture Force kg/cm |
|---|---|---|---|---|---|---|---|---|---|---|
| 001 | Exceed CA 1012 | | Exceed CA 1012 + MBc | 19.3 | 28.5 | 4 | 9 | 76 | 145 | 41.9 |
| 002 | Exceed CA 1018 | | Exceed CA 1018 + MBc | 20.5 | 34.3 | 4 | 9 | 76 | 131 | 38.7 |
| 003 | Exceed CA 1018 + 5% TiO$_2$ | | Exceed CA 1018 + MBc | 18.8 | 32.0 | 4 | 9 | 69 | 110 | 41.5 |
| 004 | Exceed CA 1018 + 5% TiO$_2$ | | Exceed CA 1018 + MBc | 17.0 | 28.0 | 4 | 9 | 70 | 105 | 31.4 |
| 005 | Exceed CA 1018 + 5% TiO$_2$ | | Exceed CA 1018 + MBc | 16.0 | 25.5 | 4 | 9 | 73 | 159 | 35.5 |
| 006 | Exceed CA 1018 + 5% TiO$_2$ | | Exceed CA 1018 + MBc + 5% Exact 5181 | 17.5 | 26.0 | 4 | 9 | 63 | 117 | 36.9 |
| 007 | Exceed CA 1018 + 5% TiO$_2$ | 5% Exact 5181 | Exceed CA 1018 + MBc + 5% Exact 5181 | 17.0 | 26.3 | 4 | 9 | 68 | 121 | 31.8 |
| 008 | Exceed CA 1018 + 5% TiO$_2$ | 5% Exact 5181 | Exceed CA 1018 + MBc | 19.8 | 28.8 | 4 | 9 | 70 | 137 | 40.5 |
| 009 | Exceed CA 1018 + 5% TiO$_2$ | | Exceed CA 1018 + MBc + 10% VM-3000 | 19.3 | 25.0 | 3.5 | 9 | 92 | 117 | 35.0 |
| 010 | Exceed CA 1018 + 5% TiO$_2$ | | Exceed CA 1018 + MBc + 10% VM-3000 | 19.0 | 26.5 | 4 | 9 | 97 | 97 | 30.4 |
| 011 | Exceed CA 1018 + 5% TiO$_2$ | | Exceed CA 1018 + MBc + 10% Escorene Ultra 720.92 | 17.3 | 25.0 | 4 | 9 | 124 | 855 | 24.9 |
| 012 | Exceed CA 1018 + 5% TiO$_2$ | | Exceed CA 1018 + MBc + 10% Exact 5181 | 17.3 | 25.0 | 4 | 9 | 159 | 876 | 26.3 |
| 013 | Exceed CA 1018 + 5% TiO$_2$ | 10% VM-3000 | Exceed CA 1018 + MBc | 18.3 | 31.5 | 4 | 9 | 269 | 1027 | 39.7 |
| 014 | Exceed CA 1018 + 5% TiO$_2$ | 10% Exact 5181 | Exceed CA 1018 + MBc | 20.3 | 31.0 | 4 | 9 | 262 | 1103 | 41.9 |
| 015 | Exceed CA 1018 + 5% TiO$_2$ | 10% Exact 5181 | Exceed CA 1018 + MBc + 10% Exact 5181 | 17.8 | 27.0 | 4 | 9 | 124 | 779 | 29.0 |
| 016 | Exceed CA 1018 + 5% TiO$_2$ | (Exact 5181 in tie layer) | Exceed CA 1018 + MBc | 17.5 | 29.3 | 4 | 9 | 262 | 1020 | 32.2 |
| 017 | Exceed CA 2018 + 5% TiO$_2$ | 10% Exact 5181 | Exceed CA 2018 + MBc + 10% Exact 5181 | 20.5 | 25.8 | 4 | 9 | 179 | 827 | 27.7 |
| 018 | Exceed CA 2018 | | Exceed CA 1018 + 26% MBa | 19.5 | 28.3 | 4.2 | 10 | 66.2 | 69 | 16.6 |
| 019 | Exceed CA 2018 + TiO$_2$ | | Exceed CA 1018 + 26% MBa | 19.5 | 28.3 | 4.2 | 10 | 57.9 | 75.8 | 16.6 |
| 020 | Exceed CA 2018 + TiO$_2$ | | Exceed CA 1018 + 26% MBb | 19.5 | 26.8 | 4.2 | 10 | 64.1 | 75.8 | 20.7 |

TABLE 3-continued

| Sample No. | First skin and second skin layers | Skin Additive | Core Layer | Polymer Gauge μ | Optical Gauge μ | MDX | TDX | Ultimate Tensile Strength MD MPa | Ultimate Tensile Strength TD MPa | Puncture Force kg/cm |
|---|---|---|---|---|---|---|---|---|---|---|
| 021 | Exceed CA 1012 + TiO$_2$ | | Exceed CA 1012 + 26% MBb | 18.0 | 23.8 | 3.5 | 10 | 58.6 | 145 | 18.9 |
| 022 | Exceed CA 1012 + TiO$_2$ | | Exceed CA 1012 + 20% MBa | 18.0 | 23.3 | 3.5 | 10 | 59.3 | 124 | 16.2 |
| 023 | Exceed CA 1012 + TiO$_2$ | | Exceed CA 1012 + 5% MBa | 22.5 | 26.3 | 2.5 | 10 | 46.9 | 165 | 13.8 |

For each sample provided above, the polymer gauge of the skin layers was approximately 1.3μ for each layer, or approximately 2.6μ per sample film. In these 3-layer embodiments, the total polymer gauge less the amount attributed to the skin layers is the approximate measure of the polymer gauge of the core layer.

By way of reference, ultimate tensile strengths of 14 currently marketed commercial kitchen bags were tested. The polymers used to create each of the tested commercial kitchen bags are non-cavitated (solid) films. The results are reported below in Table 4.

TABLE 4

| Brand | Size | Polymer Gauge, μ | MD Ult Tensile, MPa | TD Ult Tensile, MPa |
|---|---|---|---|---|
| Commercial Kitchen Bag #1 | 13 G | 24.3 | 51.28 | 37.94 |
| Commercial Kitchen Bag #2 | 13 G | 22.5 | 47.13 | 30.56 |
| Commercial Kitchen Bag #3 | 13 G | 19.3 | 56.47 | 47.44 |
| Commercial Kitchen Bag #4 | 13 G | 22.0 | 53.16 | 36.58 |
| Commercial Kitchen Bag #5 | 13 G | 11.0 | 41.36 | 39.51 |
| Commercial Kitchen Bag #6 | 13 G | 16.8 | 62.19 | 47.37 |
| Commercial Kitchen Bag #7 | 13 G | 22.3 | 53.85 | 39.37 |
| Commercial Kitchen Bag #8 | 13 G | 19.0 | 50.15 | 36.70 |
| Commercial Kitchen Bag #9 | 13 G | 18.3 | 54.98 | 32.31 |
| Commercial Kitchen Bag #10 | 13 G | 19.3 | 54.23 | 31.13 |
| Commercial Kitchen Bag #11 | 13 G | 19.3 | 51.08 | 32.89 |
| Commercial Kitchen Bag #12 | 13 G | 9.5 | 55.72 | 26.75 |
| Commercial Kitchen Bag #13 | 13 G | 23.0 | 47.01 | 30.92 |
| Commercial Kitchen Bag #14 | 13 G | 18.8 | 51.02 | 38.25 |

The average MD ultimate tensile strength and TD ultimate tensile strength of the commercial kitchen bags is 52.11 MPa and 36.27 MPa, respectively. As shown in Table 3, the ultimate tensile strength values for almost all sample films of the current invention, using biaxially oriented, cavitated films, are substantially greater than the values for the commercial kitchen bags of solid film construction.

As we have demonstrated above, the films of the current invention have improved puncture toughness and ultimate tensile strength properties while exhibiting desirable optical and tactile properties and low manufacturing cost.

The present invention is described herein with reference to certain structural embodiments; however, various other film structures are contemplated. Those skilled in the art will appreciate that numerous modifications to these embodiments may be made without departing from the scope of our invention. For example, while certain film layers are exemplified as being comprised of specific polymer blends and additives, along with a certain arrangement of layers within the film, other compositions and arrangements are also contemplated. Additionally, while finished bags, including garbage bags, leaf bags, trash can liners, pouches, sealed bags, packaging and labeling are discussed among the uses for embodiments of our inventive films, other uses, including sandwich bags and similar items, are also contemplated.

To the extent that this description is specific, it is solely for the purpose of illustrating certain embodiments of the invention and should not be taken as limiting the present inventive concepts to these specific embodiments. Therefore, the spirit and scope of the appended claims should not be limited to the description of the embodiments contained herein.

What is claimed is:

1. A thermoplastic film comprising at least a core layer, and first and second skin layers,
    said core layer comprising from 5 to 15 wt % CaCO$_3$ by weight of the core layer and an ethylene-hexene copolymer prepared by a single site catalyst and having a density equal to or less than 0.927 g/cm$^3$, and
    said first and second skin layers comprising LLDPE and from 3 to 20 wt % TiO$_2$ by weight of the skin layer; and from 3 to 20 wt %, by weight of the core or skin layer, of a plasticizer in either one skin layer or the core layer;
    said thermoplastic film having been subjected to a post-quench biaxial orientation process whereby said thermoplastic film has a machine direction orientation ratio of at least 2, a transverse direction orientation ratio of at least 4, a machine direction ultimate tensile strength of at least 45 MPa, and a transverse direction ultimate tensile strength of at least 65 MPa.

2. The thermoplastic film of claim 1, wherein said plasticizer is selected from the group consisting of high pressure low density polyethylene, very low density polyethylene, propylene plastomers and elastomers, ethylene plastomers and elastomers, low melt temperature ethylene polymers or copolymers, ethylene propylene copolymers or terpolymers, or combinations thereof.

3. The thermoplastic film of claim 1, wherein said core layer optionally further comprises opacifying agents, pigments and/or colorants.

4. The thermoplastic film of claim 3, wherein said opacifying agents, pigments and/or colorants are selected from the group consisting of iron oxide, carbon black, colored pigments, aluminum, titanium dioxide, polybutylene terephthalate, talc, and combinations thereof.

5. The thermoplastic film of claim 1, wherein said single site catalyst is a metallocene catalyst.

6. The thermoplastic film of claim 1, wherein said post-quench biaxial orientation process results in a biaxial orientation ratio ranging from about 8 to about 60.

7. The thermoplastic film of claim 1, wherein said post-quench biaxial orientation process is selected from the group consisting of a tenter frame process, a double-bubble process and a LISIM orientation process.

8. The thermoplastic film of claim 1, wherein the machine direction orientation and the transverse direction orientation of said post-quench biaxial orientation process are performed sequentially.

9. The thermoplastic film of claim 1, wherein the machine direction orientation and the transverse direction orientation of said post-quench biaxial orientation process are performed simultaneously.

10. The thermoplastic film of claim 1, wherein said thermoplastic film has a machine direction ultimate tensile strength of at least 55 MPa.

11. The thermoplastic film of claim 1, wherein said thermoplastic film has a machine direction ultimate tensile strength of at least 60 MPa.

12. The thermoplastic film of claim 1, wherein said thermoplastic film has a transverse direction ultimate tensile strength of at least 80 MPa.

13. The thermoplastic film of claim 1, wherein said thermoplastic film has a transverse direction ultimate tensile strength of at least 100 MPa.

14. The thermoplastic film of claim 1, wherein said ethylene copolymer has a Melt Index ranging from about 0.1 g/10 min. to about 20 g/10 min.

15. The thermoplastic film of claim 1, wherein said thermoplastic film has puncture force of at least 10.0 kg/cm.

16. A multi-layer thermoplastic film comprising:
(a) a core layer, said core layer comprising from 5 to 15 wt % $CaCO_3$ by weight of the core layer and an ethylene-hexene copolymer prepared by a single site catalyst and having a density equal to or less than 0.927 $g/cm^3$;
(b) a first skin layer on a side of said core layer comprising LLDPE and from 3 to 20 wt % $TiO_2$ by weight of the skin layer; and
(c) a second skin layer on a side of said core layer opposite said first skin layer comprising LLDPE and from 3 to 20 wt % $TiO_2$ by weight of the skin layer, and
from 3 to 20 wt %, by weight of the core or skin layer, of a plasticizer in either one skin layer or the core layer;
said thermoplastic film having been subjected to a post-quench biaxial orientation process whereby said thermoplastic film has a machine direction orientation ratio of at least 2, a transverse direction orientation ratio of at least 4, a machine direction ultimate tensile strength of at least 45 MPa, and a transverse direction ultimate tensile strength of at least 65 MPa.

17. The thermoplastic film of claim 16, wherein said plasticizer is selected from the group consisting of high pressure low density polyethylene, very low density polyethylene, propylene plastomers and elastomers, ethylene plastomers and elastomers, low melt temperature ethylene polymers or copolymers, ethylene propylene copolymers or terpolymers, or combinations thereof.

18. The thermoplastic film of claim 16, wherein said single site catalyst is a metallocene catalyst.

19. The thermoplastic film of claim 16, wherein said post-quench biaxial orientation process results in a biaxial orientation ratio ranging from about 5 to about 60.

20. The thermoplastic film of claim 16, wherein said post-quench biaxial orientation process is selected from the group consisting of a tenter frame process, a double-bubble process and a LISIM orientation process.

21. The thermoplastic film of claim 16, wherein the machine direction orientation and the transverse direction orientation of said post-quench biaxial orientation process are performed sequentially.

22. The thermoplastic film of claim 16, wherein the machine direction orientation and the transverse direction orientation of said post-quench biaxial orientation process are performed simultaneously.

23. The thermoplastic film of claim 16, wherein said thermoplastic film has a machine direction ultimate tensile strength of at least 55 MPa.

24. The thermoplastic film of claim 16, wherein said thermoplastic film has a machine direction ultimate tensile strength of at least 60 MPa.

25. The thermoplastic film of claim 16, wherein said thermoplastic film has a transverse direction ultimate tensile strength of at least 80 MPa.

26. The thermoplastic film of claim 16, wherein said thermoplastic film has a transverse direction ultimate tensile strength of at least 100 MPa.

27. The thermoplastic film of claim 16, wherein said ethylene copolymer has a Melt Index ranging from about 0.1 g/10 min. to about 20 g/10 min.

28. The thermoplastic film of claim 16, wherein said thermoplastic film has puncture strength of at least 10.0 kg/cm.

29. A label comprising a thermoplastic film of claim 1.

* * * * *